US006815024B2

(12) United States Patent
Beuth et al.

(10) Patent No.: US 6,815,024 B2
(45) Date of Patent: Nov. 9, 2004

(54) FLEXIBLE PIPE

(75) Inventors: Reinhard Beuth, Marl (DE); Olivier Farges, Marl (DE); Harald Kaiser, Marl (DE); Michael Schlobohm, Haltern (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/442,756

(22) Filed: Nov. 18, 1999

(65) Prior Publication Data

US 2002/0006490 A1 Jan. 17, 2002

(30) Foreign Application Priority Data

Nov. 20, 1998 (DE) .......................................... 198 53 545

(51) Int. Cl.[7] .......................... F16L 11/04; F16L 11/06; B29D 24/00
(52) U.S. Cl. ................ 428/36.9; 428/36.91; 428/36.92; 525/66; 525/183; 525/432
(58) Field of Search .............................. 428/36.9, 36.91, 428/36.92; 525/66, 183, 432

(56) References Cited

U.S. PATENT DOCUMENTS

| | | | | |
|---|---|---|---|---|
| 4,554,320 A | * | 11/1985 | Reimann et al. ............. 525/183 |
| 4,755,552 A | * | 7/1988 | Jadamus et al. ............. 524/491 |
| 5,071,924 A | * | 12/1991 | Koch et al. ................ 525/432 |
| 5,179,164 A | * | 1/1993 | Lausberg et al. ........... 525/179 |
| 5,256,460 A | * | 10/1993 | Yu ............................ 428/36.9 |
| 5,330,810 A | * | 7/1994 | Nishino ................... 428/36.91 |
| 5,362,530 A | * | 11/1994 | Kitami et al. ............... 428/36.2 |
| 5,472,754 A | * | 12/1995 | Douchet et al. .......... 428/36.91 |
| 5,472,784 A | | 12/1995 | Röber et al. ................. 428/421 |
| 5,814,384 A | * | 9/1998 | Akkapeddi et al. ......... 428/35.7 |
| 5,948,503 A | * | 9/1999 | Yamamoto et al. .......... 428/113 |
| 6,025,055 A | * | 2/2000 | Bouilloux et al. ........... 428/192 |
| 6,068,026 A | * | 5/2000 | Garois ......................... 138/126 |
| 6,177,162 B1 | * | 1/2001 | Siour et al. ............... 428/36.91 |

FOREIGN PATENT DOCUMENTS

| | | |
|---|---|---|
| EP | 0 234 819 | 9/1987 |
| EP | 0 716 126 | 6/1996 |
| FR | 0 73 1308 A1 * | 9/1996 |
| WO | WO 95/35347 | 12/1995 |
| WO | WO 98/28363 | 7/1998 |

OTHER PUBLICATIONS

Toyobo KK, Derwent Abstract JP05255589A, Oct. 5, 1993.*

* cited by examiner

*Primary Examiner*—Harold Pyon
*Assistant Examiner*—Sow-Fun Hon
(74) *Attorney, Agent, or Firm*—Oblon, Spivak, McClelland, Maier & Neustadt, P.C.

(57) ABSTRACT

A pipe whose at least interior wall structural component is comprised of:

I. from 40 to 80 parts by weight of a polyamide, and
II. from 60 to 20 parts by weight of a flexible polymer whose main chains consist of carbon atoms, where the amounts of I and II in parts by weight total 100, the pipe being useful for the piping of aqueous, aqueous-alcoholic or purely alcoholic liquids.

24 Claims, No Drawings

FLEXIBLE PIPE

BACKGROUND OF THE INVENTION

This application claims priority from German application No. 19853545.7, filed Nov. 20, 1998.

1. Field of the Invention

The present invention relates to a flexible pipe with high dimensional stability, good recovery performance and good resistance to media, and whose inner region is composed of a material with only small amounts of extractable materials. In the present text, the term "pipe" includes the term "hose".

2. Description of the Background

For many applications, for example, in the automotive sector, pipes of high flexibility are demanded. Examples of such pipes include screen wash systems, which are frequently produced from plasticized PVC (G. Walter, Kunststoffe und Elastomere in Krafifahrzeugen, Verlag W. Kohlhannner, Stuttgart, Germany, 1985, pages 187 ff.). Over prolonged periods of use, however, this material loses plasticizer by extraction and/or evaporation and as a result becomes inflexible and embrittles, and tends to form stress cracks. In addition, the PVC is not adequately resistant to greases, oils and fuels. A further disadvantage of pipes produced from PVC is that they do not have a satisfactory capability of bonding to the other components in the system.

The combination of properties demanded for applications of this type of high flexibility and resistance to breaking when flexed, good dimensional stability, good recovery performance, good resistance to media (in particular with respect to greases, oils and fuels) and also good capability to bond to the other components in the system, has hitherto been best obtained with polyether block amides. However, in practice it has always been found that the aqueous-alcoholic media conveyed in pipes of this type extract constituents from the pipe material. The constituents which are dissolved then lead to nozzle blockages or to deposits and/or visual defects after evaporation of the wash liquid on the wetted surfaces. A need, therefore, continues to exist for a pipe which exhibits improved stability and contains a lower proportion of extractible components

SUMMARY OF THE INVENTION

Accordingly, one object of the present invention is to provide a molding composition, which is particularly useful for the preparation of at least the interior wall of a flexible plastic pipe, which pipe exhibits high dimensional stability, good recovery performance and good resistance to media, particularly alcoholic media.

Briefly, this object and other objects of the present invention as hereinafter will become more readily apparent can be attained by molding composition which comprises the following constituents:

I. from 40 to 80 parts by weight of a polyamide, and
II. from 60 to 20 parts by weight of a flexible polymer whose main chains essentially consists of carbon atoms, where the parts by weight of I and II total 100, and wherein the composition contains not more than 2% by weight of extractables, measured by extracting the granules with hot 100 percent ethanol under reflux conditions.

In a second embodiment of the invention, a pipe is formed whose at least interior wall structural component is formed from the molding composition of the invention. especially useful for the piping of aqueous, aqueous-alcoholic or purely alcoholic liquids.

DETAILED DESCRIPTION OF THE PREFERRED EMBODIMENTS

In a preferred embodiment the flexible polymer contains functional groups which facilitate bonding to the polyamide component.

In another preferred embodiment the molding composition of the invention comprises from 40 to 70 parts by weight of a polyamide I and from 60 to 30 parts by weight of a flexible polymer.

In still another preferred embodiment the molding composition of the invention has a markedly lower proportion of extractable constituents in comparison to prior art compositions of not more than 2% by weight, preferably not more than 1.6% by weight, particularly preferably not more than 1.4% by weight and very particularly preferably not more than 1.2% by weight, of extractables, measured by the method described below.

For the purposes of this invention, the polyamide component is a high molecular weight compound which has —CO—NH-bonding in its main chain. The polyamide is generally prepared by the reaction of a diamine with a dicarboxylic acid, or by the polycondensation of aminocarboxylic acids, or by the polymerization of lactams. Possible polyamides include those which can be melted by heating. Suitable examples of polyamides include PA 46, PA 6, PA 66, PA 610, PA 1010, PA 612, PA 1012, PA 11, PA 12 and PA 1212, and also amorphous copolyamides including PA 6,3-T. It is also possible to use blends of different polyamides, and also the corresponding copolyamides. The above polyamides, blends and copolyamides are known in the art as well as their processes of preparation.

The flexible polymer employed in the invention is prepared by polymerizing compounds which have an olefinic double bond or two olefinic double bonds conjugated with one another.

However, subordinate amounts of flexible polymers which are prepared by polycondensation, e.g. polyether-esteramides, polyetheresters or polyurethane elastomers, may be present as long as the extractables component of the composition remains in the range stated above.

The flexible polymer of the invention may, for example, be selected from the following classes of compounds:

a) Ethylene-$C_3$–$C_{12}$-α-olefin copolymers having from 20 to 96% by weight of ethylene, preferably from 25 to 85% by weight of ethylene. Suitable examples of the $C_3$–$C_{12}$-α-olefins employed include propene, 1-butene, 1-pentene, 1-hexene, 1-octene, 1-decene and 1-dodecene. Examples of these copolymers include ethylene-propylene rubber and LLDPE.

b) Ethylene-$C_3$–$C_{12}$-α-olefin-nonconjugated-diene terpolymers having from 20 to 85% by weight of ethylene, preferably from 25 to 75% by weight of ethylene and up to not more than about 10% by weight of a nonconjugated diene, such as bicyclo[2,2,1]heptadiene, 1,4-hexadiene, dicyclopentadiene and, in particular, 5-ethylidenenorbornene. Suitable $C_3$–$C_{12}$-α-olefins include those described in a) above. The preparation of these terpolymers, and also of the copolymers described under a), with the aid of a Ziegler-Natta catalyst, is prior art.

c) Ethylene-acrylate copolymers containing from 50 to 94% by weight of ethylene and from 6 to 50% by weight of an acrylate of the formula:

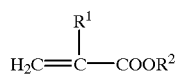

wherein $R^1 = H$ or $C_1-C_{12}$-alkyl, such as methyl, ethyl, n-propyl, n-butyl, isobutyl, sec-butyl, n-pentyl or n-hexyl, and $R^2 = C_1-C_{12}$-alkyl, as defined for $R^1$ above, or, for example, ethylhexyl, or an alkyl group which carries an epoxy group, for example a glycidyl radical, from 0 to 44% by weight of another comonomer, e.g. a $C_3-C_{12}$-α-olefin, as defined in a) above, styrene, an unsaturated mono- or dicarboxylic acid, e.g. acrylic acid, methacrylic acid, maleic acid, monobutyl maleate or itaconic acid; an unsaturated dicarboxylic anhydride, e.g. maleic anhydride or itaconic anhydride; an unsaturated oxazoline, e.g., vinyloxazoline or isopropenyloxazoline, or also an unsaturated silane, e.g., vinyltrimethoxysilane, vinyltris(2-methoxyethoxy)silane, 3-methacryloxypropyltrimethoxysilane or 3-methacryloxypropyl-triethoxysilane.

The preparation of such ethylene-acrylate copolymers by free-radical polymerization is known in the art.

d) Styrene-ethylene-butene-styrene block copolymers (SEBS) which can be obtained by hydrogenating styrene-butadiene-styrene block copolymers;

e) Polyalkenylenes, which can be prepared by ring-opening and/or ring-enlarging polymerization of cycloalkenes [see K. J. Ivin, T. Saegusa, "Ring-opening Polymerization", Vol. 1, Elsevier Appl. Sci. Publishers, London, in particular pages 121 to 183 (1984)]. Among these, polyoctenylenes (cf. A. Draxler, Kautschuk+ Gummi [Rubbers], Kunststoff 1981, pages 185 to 190) are preferred; and f) LDPE (high-pressure polyethylene).

For the purposes of the invention it is also possible to use mixtures of different flexible polymers, for example, mixtures of one or more of the polymers described in (a) to (f) with polyoctenylene.

As the description above indicates, the flexible polymer has at least the flexibility of an LLDPE with 96% by weight of ethylene, and in this case is a soft thermoplastic. However, in most cases it has the characteristic of an elastomer.

The functional groups preferably present in the flexible polymer may either be introduced via unsaturated monomers which have been copolymerized into the main chain, as is the case in polymers described in (c) above, or introduced via unsaturated monomers which are grafted onto the polymer by a thermal or free-radical route. Particularly suitable functional groups which facilitate bonding to the polyamide are carboxylic acid groups, anhydride groups, imide groups, epoxy groups, oxazoline groups and trialkoxysilane groups. The grafting of unsaturated functional compounds onto polymers is known, and a wide variety of products of this type are available commercially.

Besides constituents I and II of the present molding composition, the composition may also comprise relatively small amounts of additives which are required to achieve particular properties. Suitable examples of these additives include pigments and/or fillers, such as carbon black, titanium dioxide, zinc sulfide, silicates and carbonates; processing aids, such as waxes, zinc stearate and calcium stearate; flame retardants, such as magnesium hydroxide, aluminum hydroxide and melamine cyanurate; carbon fibers, graphite fibrils, antioxidants, and UV stabilizers. Care should be taken in all cases that the additives contribute very little to the extractable content of the composition.

The content of extractables in the molding composition is determined by subjecting granules of the material to extraction for 8 hours with hot 100 percent ethanol under reflux conditions.

The pipes of the present invention are preferably constructed entirely across their cross-section of the present molding composition. In this case they may be produced particularly simply by extrusion. However, for particular applications it may be useful to form the pipes in a two- or multilayer structure, where the innermost layer or interior wall layer is composed of the present molding composition, but toward the outside is attached one or more layers made from other materials, for example, from different impact-strength polyamide molding compositions, polyetheresteramide or nitrile rubber. The important factor is merely that the innermost layer with which the medium to be conveyed comes into contact, is composed of the present molding composition. Pipes having more than one layer are produced in a known manner by coextrusion.

Depending on the application, the tensile modulus of elasticity of the molding composition, the modulus which serves here as a measure of flexibility, is usually in the range from 200 to 950 N/mm², measured in accordance with the procedure of DIN EN ISO 527/1A.

Additional flexibility can be achieved if the pipe is corrugated, either in some areas or throughout. The production of corrugated pipes is known in the art.

The present pipes are used wherever aqueous, aqueous-alcoholic, purely alcoholic or comparable liquids are conveyed and have an extracting action on polyamides or polyetheresteramides. Examples of such piping include screen wash systems of motor vehicles, and also piping for headlamp wash systems. Besides the reduced content of extractable constituents in the present molding composition in comparison to known compositions, the present composition has the advantage of considerably improved low-temperature impact strength together with high flexibility.

Having generally described this invention, a further understanding can be obtained by reference to certain specific examples which are provided herein for purposes of illustration only and are not intended to be limiting unless otherwise specified.

EXAMPLES

Comparative Example 1

A molding composition is formulated by blending 99% by weight of polyetheresteramide prepared from 76.3 parts by weight of laurolactam, 18.8 parts by weight of polytetramethylene glycol, 4.2 parts by weight of dodecanedioic acid, 0.5% by weight of carbon black, and 0.5% by weight of a stabilizer (IRGANOX ®245). The material is extruded into 5 mm ×1 mm pipes (wall thickness 1 mm, internal width 5 mm). Granules are also prepared from the composition.

Both the starting granules and the pipe, chopped into small pieces, were then extracted in a TECATOR Soxtec HTG extractor in the following manner:

About 2 g of granules or pieces of pipe were precisely weighed to 0.001 g on an analytical balance, and, without losing any material, placed into an extraction capsule. A 50 ml amount of ethanol and a boiling chip were placed in the solvent vessel. The granules or pieces of pipe were then extracted first for 7.5 hours at 160° C. thermostated temperature in the "boiling phase" followed by 30 minutes in the "extraction phase". After this stage, the granules or pieces of pipe were allowed to cool and the extraction capsule was placed into a beaker and dried for 16 hours at 130° C. in a vacuum drying cabinet. After drying, the beaker, together with contents, was placed in a desiccator and cooled to room temperature for about 3 hours.

In order to determine the weight loss the extracted granules or pieces of pipe were reweighed without the capsule. The weight loss from the two determinations was 2.4% by weight for the granules and 2.5% by weight for the pieces of pipe.

Embodiments of pipes of the invention were installed in the screen wash system of motor vehicles, and the screen wash container was then filled with ethanol/water mixture in a ratio of 1:1. This liquid extracted the extractable constituents of the pipes which had been installed. The constituents removed by dissolution or extraction caused nozzle blockages, particularly after a relatively long period.

Example 1

A molding composition was prepared by mixing of the following components in a melt:

50 parts by weight of PA 12, $\eta_{re1}$=1.9, 50 parts by weight of EXXELOR®VA 1801 (ethylene-propylene rubber with a formulation of about ⅔ of ethylene and about ⅓ of propene, additionally functionalized with about 1% by weight of maleic anhydride), 0.5 parts by weight of carbon black, and 0.5 parts by weight of IRGANOX ®245 stabilizer.

Extraction of the granules prepared from the composition resulted in a weight loss of 1.4%, corresponding to 1.4% by weight of extractables.

The molding composition was extruded into 5 mm×1 mm pipes.

Embodiments of the pipes were installed into the screen wash system of motor vehicles.

The screen wash containers were then filled with an ethanol/water mixture in a ratio of 1:1. No nozzle blockages over time were observed.

Example 2

A molding composition was prepared by mixing the following components in a melt:

60 parts by weight of PA 12, $\eta_{re1}$=1.9, 40 parts by weight of EXXELOR®VA 1801, 0.5 parts by weight of carbon black, and 0.5 parts by weight of IRGANOX ®245.

Extraction of the granules gave 1.2% by weight of extractables.

The molding composition was extruded into 5 mm×1 mm pipes.

The pipes were installed into the screen wash system of motor vehicles. The screen wash containers were then filled with an ethanol/water mixture in a ratio of 1:1. No nozzle blockages were observed.

Example 3

A molding composition was prepared by mixing the following components in a melt:

64 parts by weight of PA 12, $\eta_{e1}$=1.9, 36 parts by weight of EXXELOR®VA 1801, 0.5 parts by weight of carbon black, and 0.5 parts by weight of IRGANOX ®245.

Extraction of the granules gave an extractable content of 1.0% by weight.

The molding composition was extruded into 5 mm×1 mm pipes.

As in Example 2, once again no nozzle blockages were observed.

Example 4

A molding composition was prepared by mixing the following components in a melt:

50 parts by weight of PA 12, $\eta_{re1}$=1.9, 50 parts by weight of KRATON® FG 1901 X (maleic-anhydride-functionalized SEBS), 0.5 parts by weight of carbon black, and 0.5 parts by weight of IRGANOX ®245.

Extraction of the granules gave an extractables content of 1.5% by weight.

The molding composition was extruded into 5 mm×1 mm pipes.

As in Example 2, once again no nozzle blockages were observed.

Example 5

A molding composition was prepared by mixing the following components in a melt:

50 parts by weight of PA 12, $\eta_{re1}$=1.9, 50 parts by weight of BYNEL® CXA 41 E 557 (LLDPE composed of, from analysis, 95.2% by weight of ethene, 3.7% by weight of butene and 1.1% by weight of hexene, additionally functionalized with about 1% by weight of maleic anhydride)

0.5 parts by weight of carbon black, and 0.5 parts by weight of IRGANOX ®245.

Extraction of the granules gave an extractables content of 0.8% by weight.

The molding composition was extruded into 5 mm×1 mm pipes.

As in Example 2, again no nozzle blockages were observed

The disclosure of German priority application serial number 19853545.7 filed Nov. 20, 1998 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A method of manufacturing screen wash systems and head lamp wash systems of motor vehicles, comprising:

fabricating the pipe components of said screen wash systems and head lamp wash systems from a pipe whose interior wall structural component is made from a molding composition comprised of:

I. from 40 to 80 parts by weight of at least one polyamide selected from the group consisting of PA 46, PA 66, PA 610, PA 1010, PA 612, PA 1012, PA 11, PA 12, PA 1212, and PA 6,3-T, and II. from 60 to 20 parts by weight of a flexible polymer whose main chain consists of carbon atoms, where the amounts of I and II in parts by weight total 100, which molding composition when in the form of granules, comprises not more than 2% by weight of extractables, measured by extracting the granules with hot 100% ethanol under reflux conditions, and wherein the pipe is useful for the piping of aqueous, aqueous-alcoholic or purely alcoholic liquids.

2. The method as claimed in claim 1, wherein the polymer components of the composition of the wall component of the pipe are present in amounts of:
I. from 40 to 70 parts by weight of said polyainide, and
II. from 60 to 30 parts by weight of said flexible polymer.

3. The method as claimed in claim 1, wherein the extractables content is not more than 1.6% by weight.

4. The method as claimed in claim 1, wherein the flexible polymer contains functional groups which facilitate bonding to the polyamide.

5. The method as claimed in claim 4, wherein the functional groups which facilitate bonding to the polyamide are carboxylic acid groups, anhydride groups, imide groups, epoxy groups, oxazoline groups or trialkoxysilane groups.

6. The method as claimed in claim 1, wherein the flexible polymer is selected from the group consisting of:
a) an ethylene-$C_3$–$C_{12}$-α-olefin copolymer having from 20 to 96% by weight of ethylene polymerized with a $C_3$–$C_{12}$-α-olefin selected from the group consisting of propene, 1-butene, 1-pentene, 1-hexene, 1-octene, 1-decene or 1-dodecene as the comonomer;
b) an ethylene-$C_3$–$C_{12}$-α-olefin-nonconjugated-diene terpolymer containing from 20 to 85% by weight of ethylene and polymerized with a $C_3$–$C_{12}$-α-olefin selected from the group consisting of propene, 1-butene, 1-pentene, 1-hexene, 1-octene, 1-decene or 1-dodecene and up to not more than about 10% by weight of a nonconjugated diene selected from the group consisting of bicyclo[2,2,1]heptadiene, 1,4-hexadiene, dicyclopentadiene and 5-ethylidenenorbornene;
c) an ethylene-acrylate copolymer containing from 50 to 94% by weight of ethylene and from 6 to 50% by weight of an acrylate of the formula:

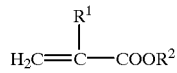

wherein $R^1$=H or $C_1$–$C_{12}$-alkyl and $R^2$=$C_1$–$C_{12}$-alkyl or an alkyl group which carries an epoxy group, and from 0 to 44% by weight of another comonomer selected from the group consisting of a $C_3$–$C_{12}$-α-olefin, styrene, an unsaturated mono- or dicarboxylic acid, an unsaturated dicarboxylic anhydride, an unsaturated oxazoline and an unsaturated silane selected from the group consisting of vinyltrimethoxysilane, vinyltris (2-methoxyethoxy)silane, 3-methacryloxypropyltrimethoxysilane and 3-methacryloxypropyltriethoxysilane;
d) styrene-ethylene-butene-styrene block copolymers (SEBS);
e) polyalkenylenes; and
f) LDPE.

7. The method as claimed in claim 1, wherein the pipe has a single-layer structure.

8. The method as claimed in claim 1, wherein the pipe has an at least two-layer structure in which the innermost layer is composed of said molding composition.

9. The method as claimed in claim 1, wherein the pipe is corrugated in some areas or throughout.

10. The method as claimed in claim 6, wherein the flexible polymer is a).

11. The method as claimed in claim 6, wherein the flexible polymer is b).

12. The method as claimed in claim 6, wherein the flexible polymer is c).

13. The method as claimed in claim 6, wherein the flexible polymer is d).

14. The method as claimed in claim 6, wherein the flexible polymer is e).

15. The method as claimed in claim 6, wherein the flexible polymer is f).

16. The method as claimed in claim 1, wherein the polyamide is PA 12 and the flexible polymer is selected from the group consisting of ethylene-propylene rubber functionalized with maleic anhydride, maleic anhydride-functionalized SEBS, and LLDPE functionalized with nialeic anhydride.

17. The method as claimed in claim 16, wherein the flexible polymer is ethylene-propylene rubber functionalized with maleic anhydride.

18. The method as claimed in claim 16, wherein the flexible polymer is maleic anhydride-fimctionalized SEBS.

19. The method as claimed in claim 16, wherein the flexible polymer is LLDPE functionalized with maleic anhydride.

20. The method as claimed in claim 1, wherein the polyamide is PA 6,3-T.

21. The method as claimed in claim 1, wherein the polyamide is PA 12 and the flexible polymer is an ethylene-propylene rubber.

22. The method as claimed in claim 1, wherein the polyamide is PA 12 and the flexible polymer is a maleic-anhydride functionalized styrene-ethylene-butene block copolymer.

23. The method as claimed in claim 1, wherein the polyamide is PA 12 and the flexible polymer is LLDPE.

24. In a screen wash system or head lamp wash system of a motor vehicle comprising pipe components fabricated from a pipe whose interior wall structural component is made from a molding composition, the improvement comprising:
a molding composition comprising
I. from 40 to 80 parts by weight of at least one polyamide selected from the group consisting of PA 46, PA 66, PA 610, PA 1010, PA 612, PA 1012, PA 11, PA 12, PA 1212, and PA 6,3-T, and
II. from 60 to 20 parts by weight of a flexible polymer whose main chain consists of carbon atoms,
where the amounts of I and II in parts by weight total 100, which molding composition when in the form of granules, comprises not more than 2% by weight of extractables, measured by extracting the granules with hot 100% ethanol under reflux conditions, and wherein the pipe is useful for the piping of aqueous, aqueous-alcoholic or purely alcoholic liquids.

* * * * *